(12) United States Patent (10) Patent No.: US 12,593,356 B2

Ji et al. (45) Date of Patent: Mar. 31, 2026

(54) CHANNEL OCCUPANCY TIME SHARING FOR SIDELINK IN UNLICENSED SPECTRUM

(71) Applicant: Nokia Technologies Oy, Espoo (FI)

(72) Inventors: Lianghai Ji, Aalborg (DK); Nuno Manuel Kiilerich Pratas, Aalborg (DK); Ling Yu, Espoo (FI); Vinh Van Phan, Oulu (FI); Yong Liu, Shanghai (CN); Tao Tao, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 296 days.

(21) Appl. No.: 18/553,714

(22) PCT Filed: May 20, 2021

(86) PCT No.: PCT/CN2021/094979
§ 371 (c)(1),
(2) Date: Oct. 2, 2023

(87) PCT Pub. No.: WO2022/241734
PCT Pub. Date: Nov. 24, 2022

(65) Prior Publication Data
US 2024/0196433 A1 Jun. 13, 2024

(51) Int. Cl.
H04W 74/0808 (2024.01)
H04W 92/18 (2009.01)

(52) U.S. Cl.
CPC ........ H04W 74/0808 (2013.01); H04W 92/18 (2013.01)

(58) Field of Classification Search
CPC .......................... H04W 74/0808; H04W 92/18
See application file for complete search history.

(56) References Cited

U.S. PATENT DOCUMENTS

| | | | |
|---|---|---|---|
| 2021/0092783 A1* | 3/2021 | Sun | .................. H04W 74/0875 |
| 2021/0400732 A1* | 12/2021 | Xue | .......................... H04L 5/14 |

FOREIGN PATENT DOCUMENTS

| | | |
|---|---|---|
| CN | 110100466 A | 8/2019 |
| WO | 2020/024854 A1 | 2/2020 |

(Continued)

OTHER PUBLICATIONS

"IEEE 802.11", Wikipedia, Retrieved on Oct. 3, 2023, Webpage available at : https://en.wikipedia.org/wiki/IEEE_802.11.

(Continued)

*Primary Examiner* — Myron Wyche

(74) *Attorney, Agent, or Firm* — SQUIRE PATTON BOGGS (US) LLP

(57) ABSTRACT

Systems, methods, apparatuses, and computer program products for channel occupancy time (COT) sharing for sidelink (SL) in unlicensed spectrum are provided. One method may include, upon acquiring a COT, an initiating user equipment (UE) transmitting a first indication to one or more responding UEs. The first indication may include at least a duration of the channel occupancy time (COT) and/or configuration information for at least one second indication. The method may also include transmitting the at least one second indication to the one or more responding UEs prior to a SL transmission from the one or more responding UEs. The at least one second indication may include an indication of a listen before talk (LBT) type that the one or more responding UEs should apply for the SL transmission taking place within the COT duration and/or an indication of a new COT duration.

20 Claims, 7 Drawing Sheets

(56)                References Cited

FOREIGN PATENT DOCUMENTS

WO        2020/164439 A1        8/2020
WO        2020/168320 A1        8/2020
WO        2020/190190 A1        9/2020

OTHER PUBLICATIONS

"3rd Generation Partnership Project; Technical Specification Group Radio Access Network; Physical layer procedures for shared spectrum channel access (Release 16)", 3GPP TS 37.213, V16.5.0, Mar. 2021, pp. 1-27.
"3rd Generation Partnership Project; Technical Specification Group Radio Access Network; NR; Multiplexing and channel coding (Release 16)", 3GPP TS 38.212, V16.5.0, Mar. 2021, pp. 1-152.

International Search Report and Written Opinion received for corresponding Patent Cooperation Treaty Application No. PCT/CN2021/094979, dated Jan. 26, 2022, 9 pages.
"Rel-17 NR-U Enhancements email discussion [Unlicensed_enh] Summary", 3GPP TSG RAN Meeting #86, RP-192923, Agenda: 9.1.1, Nokia, Dec. 9-12, 2019, pp. 1-23.
Office action received for corresponding Chinese Patent Application No. 202180006486.8, dated Jun. 21, 2025, 9 pages of office action and 7 pages of translation available.
"Enhancements for unlicensed band URLLC/IIoT", 3GPP TSG RAN WG1#104-e, R1-2100438, Agenda. 8.3.2, Vivo, Jan. 25-Feb. 5, 2021, 9 pages.
Chinese Office Action, with English machine translation, corresponding to CN Application No. 202180006486.8, dated Jan. 10, 2026.

* cited by examiner

705 —— Acquiring a channel occupancy time (COT)

710 —— Transmitting a first indication to one or more responding UE(s)

715 —— Determining second indication(s) based on the initiating UE's communication activities and/or channel sensing during a time gap 720 —— Transmitting the second indication(s) to the responding UE(s)

750 — Receiving a first indication from an initiating UE

755 — Receiving one or more second indication(s) from the initiating UE

760 — Determining the COT and/or the LBT type to apply for a SL TX, based on the information received in the first and/or second indication 765 — Performing the SL TX based on the determination

CHANNEL OCCUPANCY TIME SHARING FOR SIDELINK IN UNLICENSED SPECTRUM

RELATED APPLICATION

This application was originally filed as PCT Application No. PCT/CN2021/094979 on May 20, 2021, which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for channel occupancy time (COT) sharing for sidelink (SL) in unlicensed spectrum.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IOT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to a method that may include, upon acquiring a channel occupancy time (COT), transmitting, by an initiating user equipment, a first indication to at least one responding user equipment. The first indication may include at least a duration of the channel occupancy time (COT) and/or configuration information for at least one second indication. The method may also include transmitting the at least one second indication to the at least one responding user equipment prior to a sidelink transmission from the at least one responding user equipment. The at least one second indication may include at least one of an indication of listen before talk (LBT) type that the at least one responding user equipment should apply for the sidelink transmission taking place within the channel occupancy time (COT) duration or an indication of a new channel occupancy time (COT) duration.

An embodiment may be directed to a method that may include receiving, from an initiating user equipment, a first indication at responding user equipment. The first indication may include at least a duration of a channel occupancy time (COT) and/or configuration information for at least one second indication. The method may include receiving the at least one second indication prior to a sidelink transmission by the responding user equipment, where the at least one second indication may include at least one of an indication of listen before talk (LBT) type that the responding user equipment should apply for the sidelink transmission taking place within the channel occupancy time (COT) duration or an indication of a new channel occupancy time (COT) duration. The method may also include, based on at least one of the first indication and the second indication, determining at least one of the channel occupancy time (COT) or the listen before talk (LBT) type to apply for sidelink transmission, and performing the sidelink transmission based on the determination.

An embodiment may be directed to an apparatus, which may include at least one processor and at least one memory comprising computer program code. The at least one memory and computer program code are configured, with the at least one processor, to cause the apparatus at least to, upon acquiring a channel occupancy time (COT), transmit a first indication to at least one responding user equipment. The first indication may include at least a duration of the channel occupancy time (COT) and/or configuration information for at least one second indication. The at least one memory and computer program code may be further configured, with the at least one processor, to cause the apparatus at least to transmit the at least one second indication to the at least one responding user equipment prior to a sidelink transmission from the at least one responding user equipment, where the at least one second indication may include at least one of an indication of listen before talk (LBT) type that the at least one responding user equipment should apply for the sidelink transmission taking place within the channel occupancy time (COT) duration or an indication of a new channel occupancy time (COT) duration.

An embodiment may be directed to an apparatus, which may include at least one processor and at least one memory comprising computer program code. The at least one memory and computer program code are configured, with the at least one processor, to cause the apparatus at least to receive, from an initiating user equipment, a first indication. The first indication may include at least a duration of a channel occupancy time (COT) and/or configuration information for at least one second indication. The at least one memory and computer program code may be further configured, with the at least one processor, to cause the apparatus at least to receive the at least one second indication prior to a sidelink transmission by the apparatus, where the at least one second indication may include at least one of an indication of listen before talk (LBT) type that the apparatus should apply for the sidelink transmission taking place within the channel occupancy time (COT) duration or an indication of a new channel occupancy time (COT) duration. The at least one memory and computer program code may be further configured, with the at least one processor, to cause the apparatus at least to, based on at least one of the first indication and the second indication, determine at least one of the channel occupancy time (COT) or the listen before talk (LBT) type to apply for sidelink transmission, and perform the sidelink transmission based on the determination.

An embodiment may be directed to an apparatus that may include, upon acquiring a channel occupancy time (COT), means for transmitting a first indication to at least one responding user equipment. The first indication may include at least a duration of the channel occupancy time (COT) and/or configuration information for at least one second indication. The apparatus may also include means for transmitting the at least one second indication to the at least one responding user equipment prior to a sidelink transmission from the at least one responding user equipment, where the at least one second indication comprises at least one of an indication of listen before talk (LBT) type that the at least one responding user equipment should apply for the sidelink transmission taking place within the channel occupancy time (COT) duration or an indication of a new channel occupancy time (COT) duration.

An embodiment may be directed to an apparatus that may include means for receiving, from an initiating user equipment, a first indication that may include at least a duration of a channel occupancy time (COT) and/or configuration information for at least one second indication, and means for receiving the at least one second indication prior to a sidelink transmission by the apparatus. The at least one second indication may include at least one of +an indication of listen before talk (LBT) type that the apparatus should apply for the sidelink transmission taking place within the channel occupancy time (COT) duration or an indication of a new channel occupancy time (COT) duration. The apparatus may also include, based on at least one of the first indication and the second indication, means for determining at least one of the channel occupancy time (COT) or the listen before talk (LBT) type to apply for sidelink transmission, and means for performing the sidelink transmission based on the determination.

BRIEF DESCRIPTION OF THE DRAWINGS

For proper understanding of example embodiments, reference should be made to the accompanying drawings, wherein.

4

Figure 5:
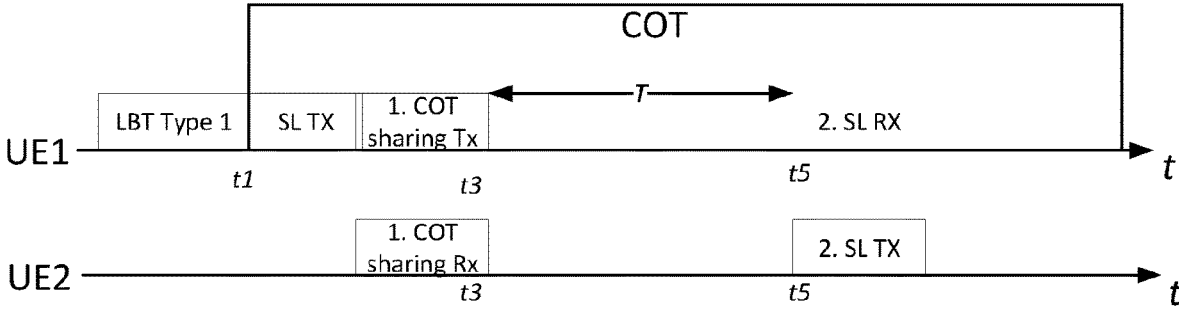
Figure 6:
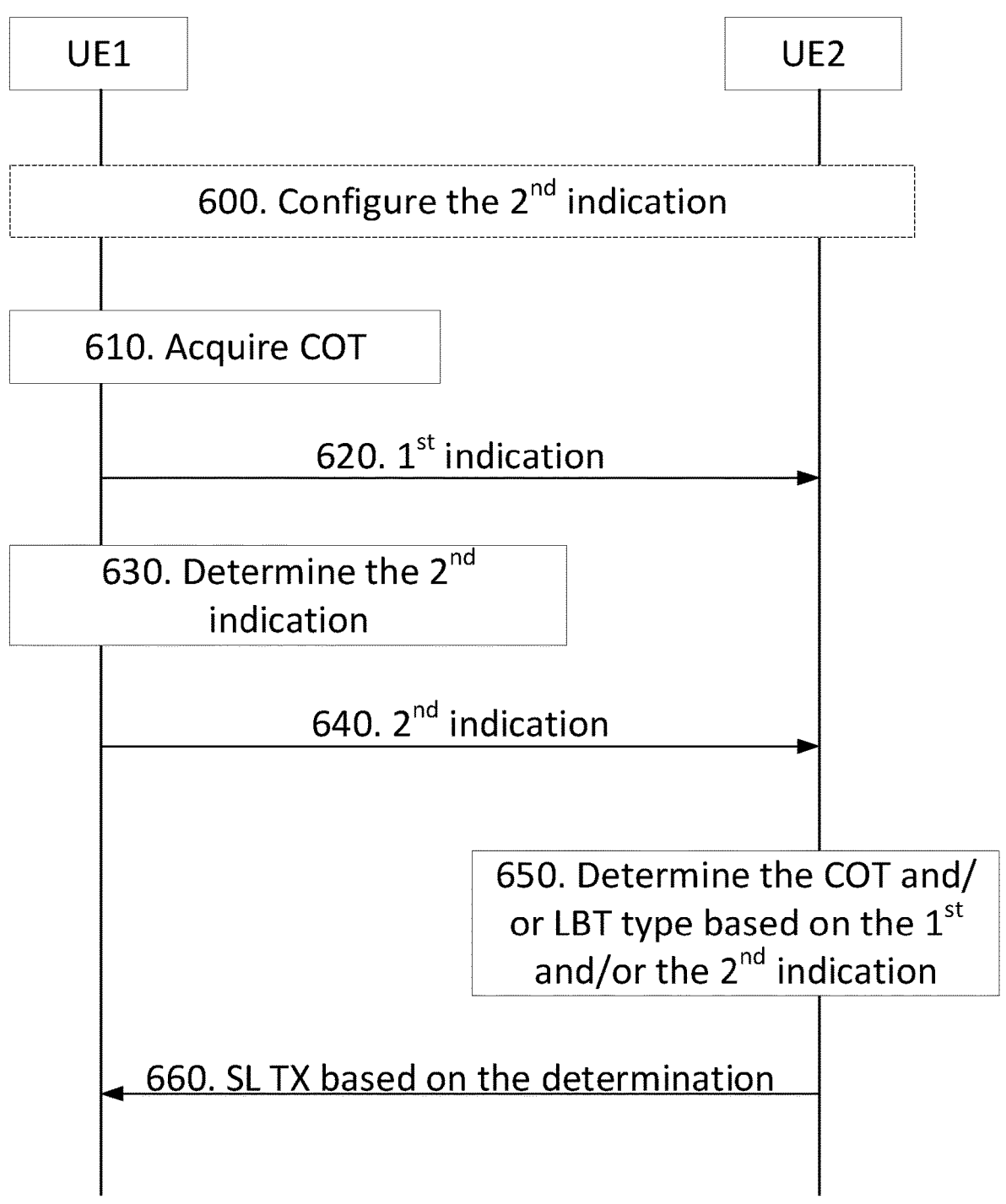
Figure 7A:
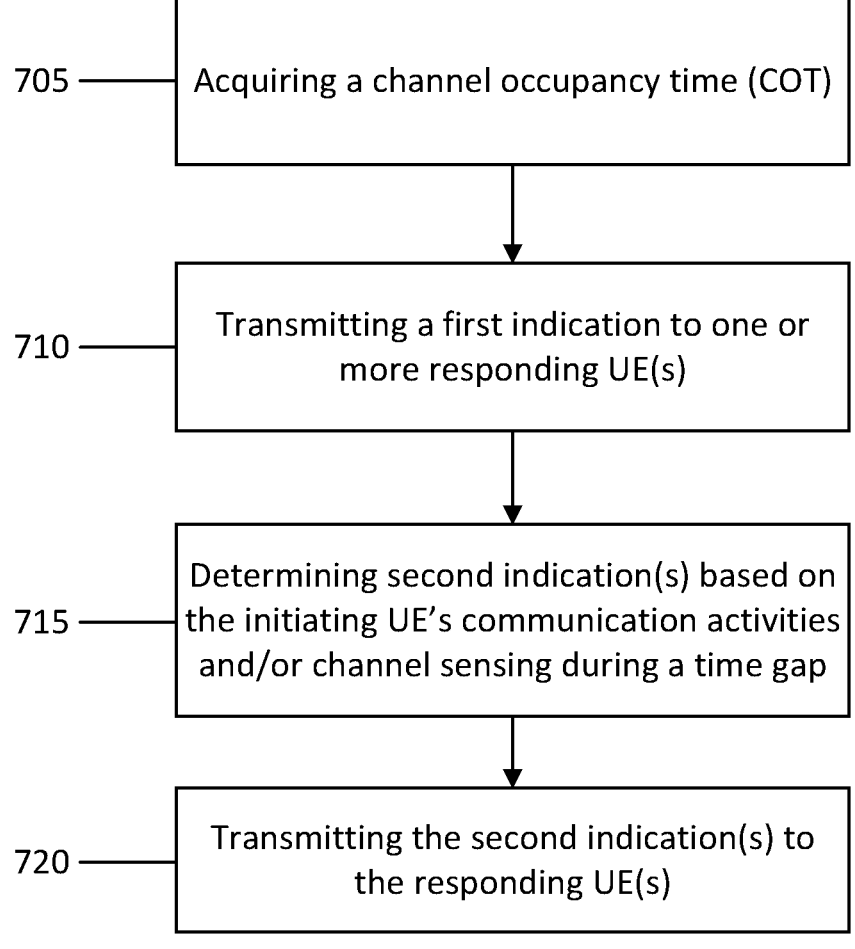
Figure 7B:
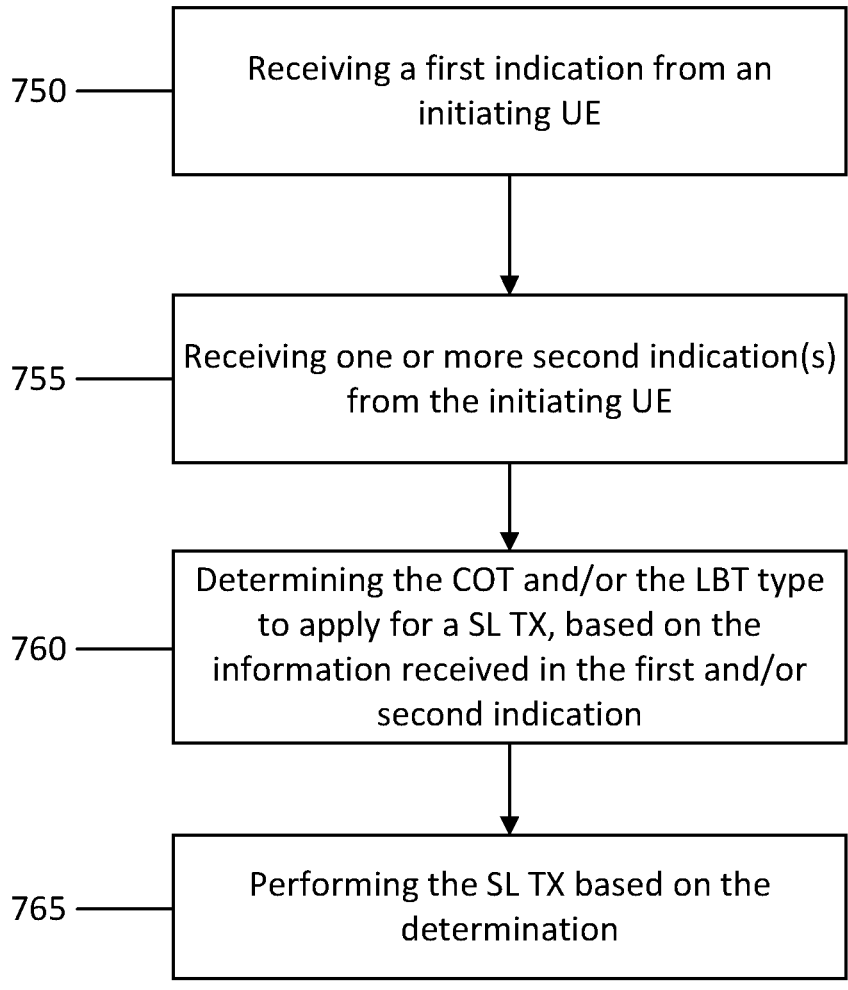
Figures 8A, 8B:
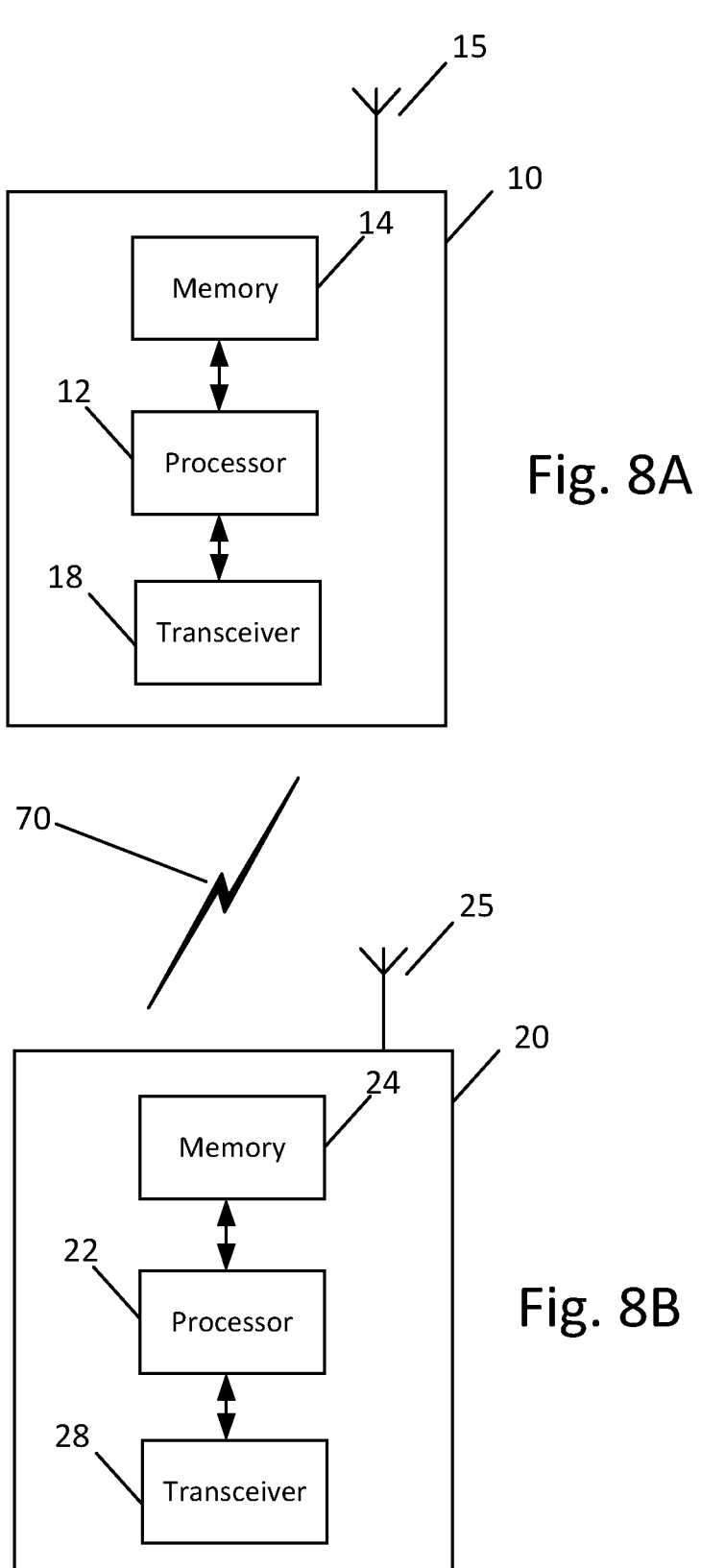

FIG. 5 illustrates an example of a COT sharing procedure in time domain, according to an embodiment;

FIG. 6 illustrates an example signaling diagram, according to an embodiment;

FIG. 7A illustrates an example flow diagram of a method, according to an embodiment;

FIG. 7B illustrates an example flow diagram of a method, according to an embodiment;

FIG. 8A illustrates an example block diagram of an apparatus, according to an embodiment; and FIG. 8B illustrates an example block diagram of an apparatus, according to an embodiment.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for channel occupancy time (COT) sharing for sidelink (SL) in unlicensed spectrum, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

In sub-7 GHz unlicensed bands, the new radio (NR) coexistence with other systems (e.g., IEEE 802.11) is ensured via a Listen Before Talk (LBT) channel access mechanism. According to this mechanism, a user equipment (UE) intending to perform a sidelink (SL) transmission needs to first successfully complete an LBT check, before being able to initiate that same transmission.

For a UE to pass an LBT check, it should observe the channel as available for a number of consecutive Clear Channel Assessment (CCA) slots. In sub-7 GHZ, the duration of these slots is 9 μs. The UE deems the channel as available in a CCA slot if the measured power (i.e., the collected energy during the CCA slot) is below a regulatory specified threshold (which can depend on the operating band and geographical region).

Figures 1, 2A, 2B, 2C, 2D, 2E, 2F:
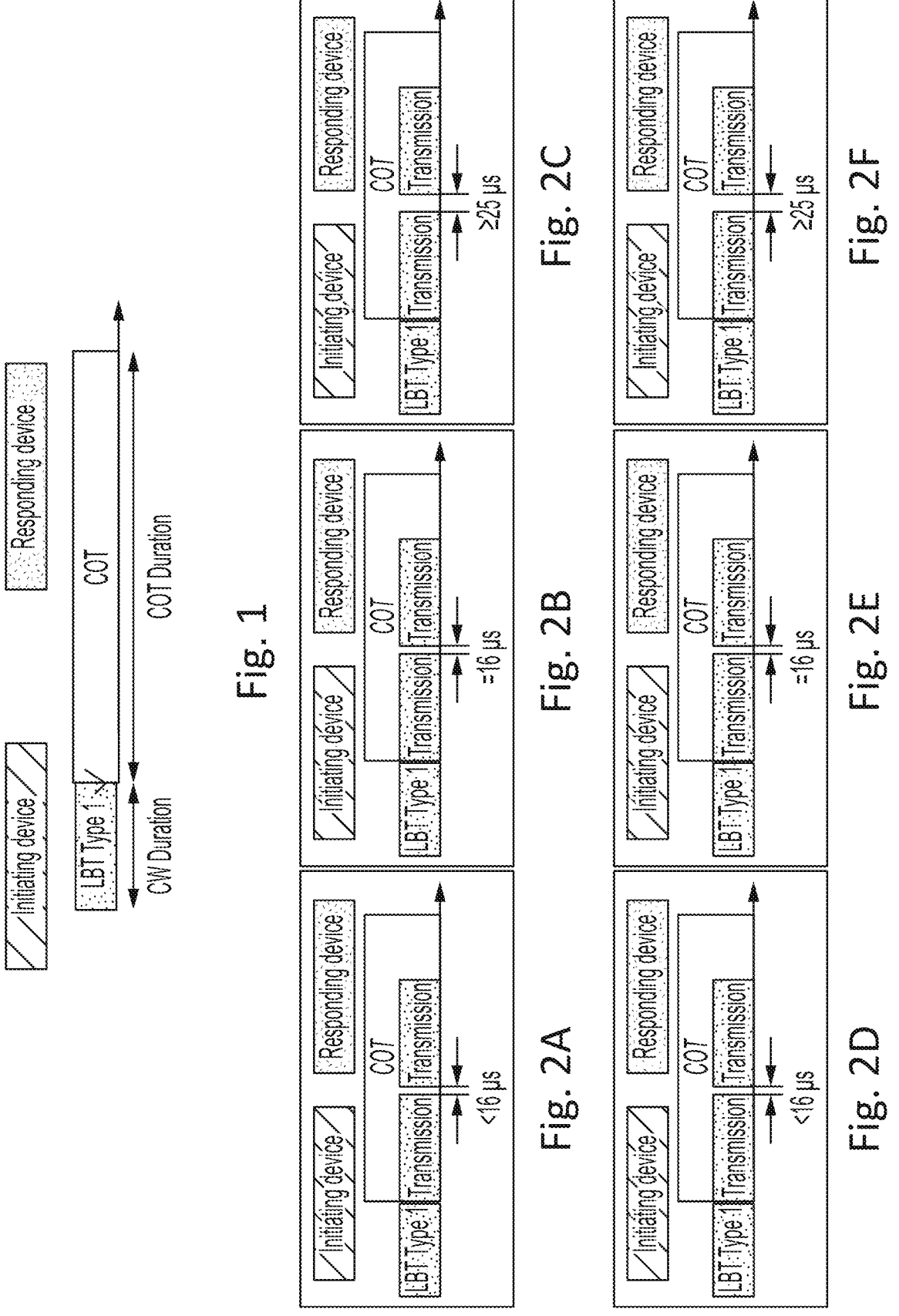
FIG. 1 illustrates an example of the acquisition of the channel occupancy time (COT) by an initiating device via listen before talk (LBT) type 1.
FIG. 2(a) illustrates an example of the allowed gaps for LBT type 2C.
FIG. 2(b) illustrates an example of the allowed gaps for LBT type 2B.
FIG. 2(c) illustrates an example of the allowed gaps for LBT type 2A.
FIG. 2(d) illustrates an example of the allowed gaps for LBT type 2C.
FIG. 2(e) illustrates an example of the allowed gaps for LBT type 2B.
FIG. 2(f) illustrates an example of the allowed gaps for LBT type 2A.

When a UE initiates the communication (i.e., the UE takes the role of initiating device), then this UE has to acquire the "right" to access the channel for a certain period of time—denoted in the regulations as the Channel Occupancy Time (COT)—by applying an "extended" LBT procedure where the channel must be deemed as free for the entire duration of a Contention Window (CW). This "extended" LBT procedure, is commonly known as LBT type 1 (e.g., as specified in 3GPP TS 37.213). FIG. 1 illustrates an example of the acquisition of the COT by an initiating device via LBT type 1.

The duration of both the COT and CW may depend on the Channel Access Priority Class (CAPC) associated with the UE's traffic, as shown in Table 1 below (e.g., Table 1 may correspond to Table 4.2.1-1 from TS 37.213). Control plane traffic, such as physical shared control channel (PSCCH), is transmitted with p=1, while user plane traffic has p>1. Specifically, Table 1 depicts CAPC for UL, where the contention window length in CCA slots associated with each CAPC has a minimum ($CW_{min,p}$) and maximum ($CW_{max,p}$). The duration of the COT is given by $T_{ulm\ cot,\ p}$. In Table 1, the LBT type 1 details are depicted for the Uu uplink (UL) case, but it is noted that the downlink (DL) case LBT type 1 parameters could also in principle be adopted in SL.

TABLE 1

| Channel Access Priority Class (p) | $m_p$ | $CW_{min, p}$ | $CW_{max, p}$ | $T_{ulm\ cot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot, p}$ = 10 ms if the higher layer parameter absenceOfAnyOtherTechnology-r14 or absenceOfAnyOtherTechnology-r16 is provided, otherwise, $T_{ulm\ cot, p}$ = 6 ms.
NOTE 2:
When $T_{ulm\ cot, p}$ = 6 ms it may be increased to 8 ms by inserting one or more gaps. The minimum duration of a gap shall be 100 us. The maximum duration before including any such gap shall be 6 ms.

The UE that initiates the transmission (the initiating device), upon successfully completing the LBT type 1 and performing a transmission, may acquire the COT with duration associated with the corresponding CAPC. The acquired COT is valid even in the case where the initiating device pauses its transmission, although if the initiating device wants to perform a new transmission (within the COT) it is still required to perform a "reduced" LBT procedure. This "reduced" LBT procedure, is commonly known as LBT type 2 (e.g., see TS 37.213), with variants of type 2A, type 2B, and type 2C. FIGS. 2a-2f illustrate the allowed gaps for which LBT type 2 variant to be applicable: FIGS. 2(a) and 2(d) depict LBT type 2C; FIGS. 2(b) and 2(e) depict LBT type 2B; and FIGS. 2(c) and 2(f) depict LBT type 2A. For example, FIGS. 2(a), 2(b), and 2(c) illustrate the case where the gap is between the two transmissions both from the initiating UE, while FIGS. 2(d), 2(e), and 2(f) illustrate the case that the gap is between the two different transmissions from the initiating UE and the responding UE correspondingly. Type 2A (25 μs LBT) is for SL transmissions within the initiating device acquired COT (in case the gap between two SL transmissions is ≥25 μs, as well for SL transmissions following another SL transmission), as depicted in FIGS. 2(c) and 2(f). Type 2B (16 μs LBT) is for SL transmission within the initiating device acquired COT (can only be used for SL transmissions following another SL with gap exactly equal to 16 μs), as depicted in FIGS. 2(b) and 2(e). Type 2C (no LBT) can only be used for SL transmission following another SL, with a gap≤ 16 μs and the allowed duration of the SL transmission≤ 584 μs), as depicted in FIGS. 2(a) and 2(d) or FIGS. 2(b) and 2(e).

Figure 3:
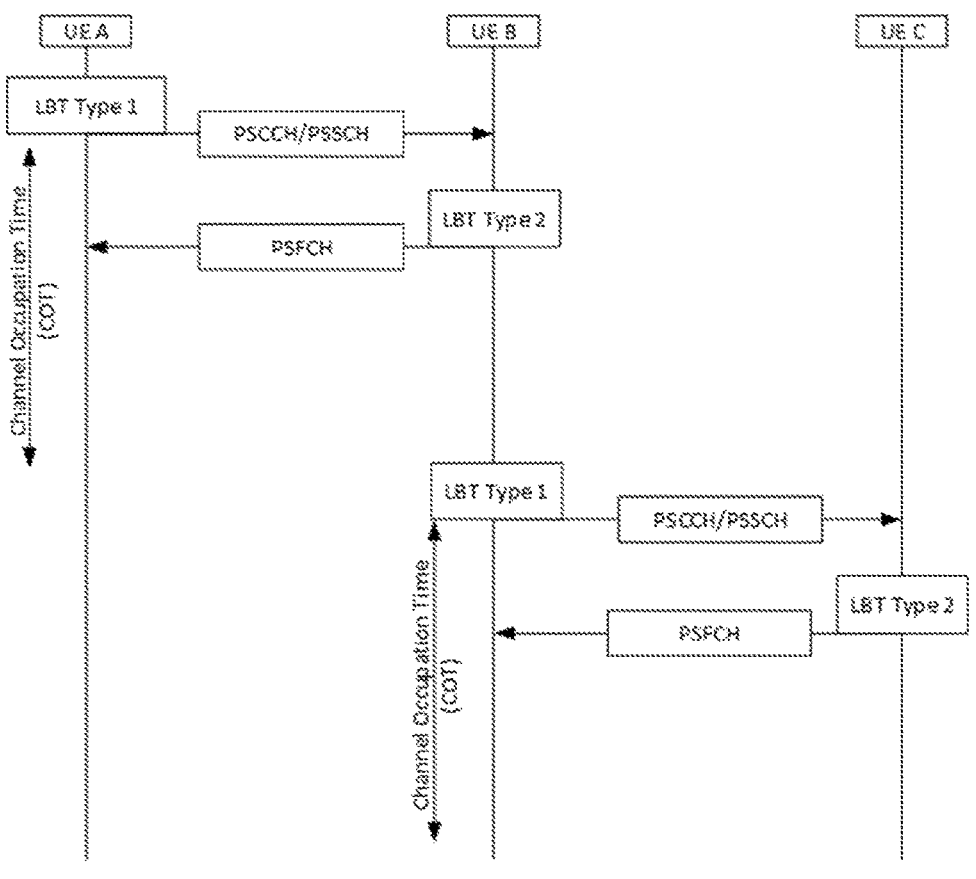
FIG. 3 illustrates a signaling diagram depicting an example in which a responding device has to acquire a new COT.

The initiating device can share its acquired COT with its intended receiver (e.g., the responding device). For this purpose, the initiating device may inform (e.g., via control signaling) the responding device about the duration of this COT. The responding device may then use this information to decide which type of LBT it should apply upon performing a transmission for which the intended receiver is the initiating device. In case the responding device transmission falls outside the COT, then the responding device will have to acquire a new COT using the LBT type 1 with the appropriate CAPC. FIG. 3 illustrates a signaling diagram depicting an example in which a responding device, e.g., UE B or UE C, has to acquire a new COT.

Figure 4:
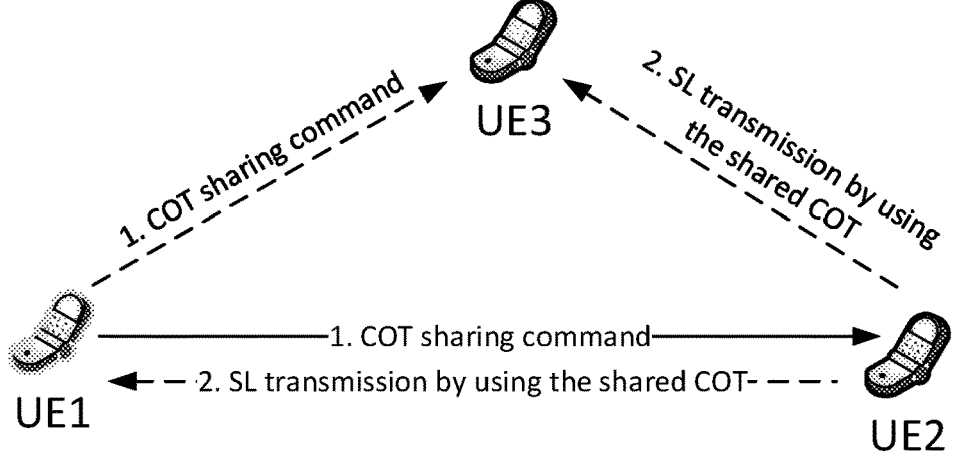
FIG. 4 illustrates an example system diagram of a UE sharing its obtained COT with one or more other UEs, according to an embodiment.

Certain embodiments described herein may involve SL operations in unlicensed spectrum, as illustrated in the example diagram of FIG. 4. More specifically, FIG. 4 illustrates an example of a UE sharing its obtained COT with one or more other UEs. As discussed above, if an initiating SL UE, such as UE1 in the example of FIG. 4, succeeds in its LBT type 1, the initiating SL UE may share its acquired COT with at least one another responding SL UE, such as UE2 and/or UE3, e.g., as shown in procedure 1 of FIG. 4. As one example, the initiating SL UE may explicitly inform (i.e., via control signalling) a particular responding UE (e.g., UE2 and/or UE3) about the COT sharing and/or the duration of the acquired COT. Afterwards, the responding SL UE (e.g., UE2 or UE3) may apply LBT type 2 (e.g., type 2a, 2B, 2C) based on the shared COT, as shown in procedure 2 of FIG. 4.

FIG. 5 illustrates an example of a COT sharing procedure in time domain. As illustrated in the example of FIG. 5, at time t1, UE1 succeeds in its LBT type 1 and acquires the COT. Afterwards, UE1 may send the COT sharing command to UE2 (e.g., as in procedure 1 in FIG. 4), where UE2 receives the COT sharing at time instance t3. It is noted, there may or may not be another SL TX from UE1 between UE1 acquiring the COT and UE1 sharing the COT with UE2. However, when UE1 sends the COT sharing command to UE2, UE1 may not be able to know which variant of LBT type 2 UE2 should apply for performing its SL TX at time instance t5. For example, the UE 1 may have planned (or have had indicated in a previous transmission) that it will have a (consecutive) transmission during the considered time gap T, which if performed enables the UE2 to apply LBT type 2C. However, the UE1 might be prevented from performing that transmission, e.g., because UE1 may need to perform resource (re)selection, resource pre-emption and reevaluation, and/or prioritization for the communication activities (e.g., perform a transmission or reception over the PC5/Uu interface) in the time gap T, and/or because UE1 may skip a retransmission scheduled in a slot in the time gap T, e.g., if the previous transmission attempt is successful based on the Hybrid Automatic Repeat-Request (HARQ) feedback.

The uncertainties of UE1's communication activities in the time gap T may depend on, for example, the UE processing time and/or the length of the time gap T. Thus, one problem related with the considered COT sharing procedure in SL is how the responding UE (e.g., UE2 in the examples of FIGS. 4 and 5) will know the LBT type to be applied for using the COT shared by UE1.

In addition, according to the mechanism discussed above for the Uu interface, during UE1's transmission pause (e.g., corresponding to (part of) the time gap T illustrated in FIG.

5) inside the shared COT period, the channel needs to be sensed to detect whether the channel is continuously idle or not and then accordingly select LBT type 1 or LBT type 2 to be used for later transmission after the pause. It is noted that the regulation for applying SL in unlicensed spectrum has not been specified. However, in order to keep the fairness for the non-3GPP technology to use the unlicensed spectrum, UE2 may need to decide its applicable LBT type based on its channel sensing result during the transmission pause. In other words, if there is a transmission pause, where UE1 and/or its other peer responding UEs sharing the same COT stop transmitting in the unlicensed spectrum, UE2 may only apply type 2 LBT before its transmission taking place inside the shared COT if the channel is sensed as continuously idle in the transmission pause. In order to do that, UE2 may have to identify the transmission pause, where UE1 and/or its other peer responding UEs sharing the same COT stop transmitting in the unlicensed spectrum, and may have to sense the channel in the identified transmission pause.

The first step may be difficult for UE2 to perform if targeting high accuracy, since the SL transmissions from the other peer responding UEs of UE1 may or may not be detectable by UE2. In addition, in case of SL with distributed resource allocation mode (e.g., SL mode 2 UE autonomous resource allocation) for SL transmission, the transmission gap/pause is more unpredictable than gNB scheduled UL transmission in NR-U. Each individual UE needs to detect transmission pause not only from itself, but also from other relevant UEs (e.g., the other peer responding UEs of UE1) sharing the same COT. This results in more complexity for transmission pause detection on the one hand, and also for continuous channel sensing during identified transmission gap on the other hand. Thus, it may be desirable for UE1 to perform the channel sensing during the transmission pause instead of UE2.

Thus, as will be discussed in detail below, certain embodiments aim to maximize the usage of LBT type 2 for COT sharing with responding UE (e.g. UE2) without requiring the responding UE (e.g. UE2) to sense the channel for selection of LBT type 1 or type 2 during COT remaining time.

As will be discussed in detail below, certain embodiments may provide a two-stage COT sharing method, e.g., in order to address the uncertainties associated with transmission pause as well as the selection of which LBT type (type 1 or type 2A/B/C) that a responding UE should apply for its SL transmission (TX) inside the COT. It is noted that, as used herein, UE1 may refer to an initiating device, UE or SL UE, and UE2 and/or UE3 may refer to a responding device, UE or SL UE.

In an embodiment, upon acquiring a COT, UE1 may send a first indication to at least one responding SL UE, e.g. UE2 and/or UE3 in the example of FIG. 4. The first indication may contain at least the duration of the acquired COT. Thus, the responding SL UE can, in principle, apply LBT type 2A/B, 2C for its SL TX, e.g., towards at least UE1, if the SL TX takes place inside the acquired COT duration. However, at this point, the responding UE has not yet been indicated which specific LBT type to apply.

It is noted that the first indication may contain detailed COT-sharing information (e.g., COT duration, identifier of the responding UE(s), etc.), for example, using sidelink control information (SCI) and/or payload, such as medium access control (MAC) control element (CE), PC5-radio resource control (RRC), and/or upper layer (non-access stratum (NAS)/application layer) message. In one embodiment, the first indication may further contain the configuration information of one or more second indications. In one embodiment, the first indication may also contain the activation of the 2-stage COT sharing. In one embodiment, the first indication may also contain the information that a responding UE does not need to detect a transmission pause and sense the channel during the transmission pause. This information may be also implicitly indicated by having, in the first indication, the configuration information of the second indication and/or the activation of the 2-stage COT sharing.

According to an embodiment, UE1 may send one or more second indication(s) to UE2 and/or UE3, before the SL TX from UE2 and/or UE3 takes place. The second indication may include at least one of the following information: the LBT type that UE2 and/or UE3 should apply for its SL TX taking place inside the COT duration indicated in the first indication, and/or a new COT duration, e.g., if UE1 performs LBT type 1 during the time gap T and acquires a new COT. In one embodiment, the LBT type may be determined by UE1 based on UE1's communication activities and channel sensing during the time gap T. For example, LBT type 1 may be indicated if non-idle channel is sensed during the detected transmission pause. The LBT type 1 indication may also imply the shared COT is not valid anymore. As another example, LBT type 2C may be indicated if no transmission pause has been identified. In another example, LBT type 2A/2B may be indicated if idle channel is sensed by UE1 during the detected transmission pause. In this case, UE2 my still perform a type 2A/2B channel sensing, e.g., for the sake/fairness of other non-3GPP technologies operating in the unlicensed spectrum. In one embodiment, a second indication may implicitly imply a particular LBT type, e.g. type 2C or type 1, which should be applied by UE2 and/or UE3. Thus, if no second indication is transmitted, this means that UE2 and/or UE3 should apply the other LBT type, e.g., type 2A/2B. This allows a simple detection at UE2 and/or UE3 for the second indication. In one embodiment, in order to reduce the processing time of the second indication at UE2 and/or UE3, the second indication may be transmitted in a light format such that UE2 and/or UE3 can quickly detect the second indication to unlock type 2C or release the shared COT. For example, the light format may include a transmission over a physical sidelink feedback channel (PSFCH), a transmission in a sidelink control information (SCI), and/or a transmission in a medium access control (MAC) control element (CE).

Accordingly, UE2 and/or UE3 may perform its SL TX inside the COT based on the indicated LBT type. If UE2 and/or UE3 did not receive the second indication or the proposed 2-step COT sharing scheme is not activated, UE2 and/or UE3 may determine the LBT type 2 as configured for COT sharing (e.g., LBT type 2 A/B is configured as the default LBT Type during COT sharing period, which is the case for COT sharing in the Uu interface). If UE2 and/or UE3 received the second indication indicating an LBT type to be applied, UE2 and/or UE3 may apply the indicated LBT type for using the shared COT. If UE2 receives a new COT duration in the second indication(s), UE2 and/or UE3 may apply the new COT duration.

FIG. 6 illustrates an example signalling flowchart for the 2-step COT sharing procedure, according to certain embodiments. For sake of simplicity, FIG. 6 illustrates just UE2 as the responding UE, but any number of additional UEs may be included as responding UEs. As illustrated in FIG. 6, at 600, UE1 and/or UE2 may be configured with the configuration of resources for transmitting and receiving the $2^{nd}$ indication. The configuration may contain at least the time, frequency, and/or code domain resource(s) used for the $2^{nd}$ indication. In some embodiments, the UEs may be configured, for example, by the network, by pre-configuration, by technical specifications, and/or by SL signaling, etc. In an embodiment, the resource(s) for transmitting and/or receiving the $2^{nd}$ indication may or may not be associated with the $1^{st}$ indication and/or UE2's SL TX resource, implicitly.

In one embodiment, the resource(s) for the $2^{nd}$ indication in time domain may be immediately or directly before UE2's SL TX resource. In one embodiment, the resource(s) for the $2^{nd}$ indication in time domain may be determined based on the identified transmission pause. For example, the resource for transmitting the $2^{nd}$ indication may appear at the end of identified transmission pause that can be predicted based on the reserved resources of the monitored SCI from relevant SL UEs. In one embodiment, the resource(s) for $2^{nd}$ indication may be configured at the end of every transmission time interval (TTI). Alternatively or additionally, in one embodiment, the $2^{nd}$ indication may be transmitted only if there is no SL transmission in the TTI. In one embodiment, the resource(s) for the $2^{nd}$ indication (e.g., the frequency and/or the code domain resource) may be associated with at least one information contained in the $1^{st}$ indication, e.g., an identifier (ID) contained in the SCI of the $1^{st}$ indication, the resource used by the $1^{st}$ indication, and/or the priority of the $1^{st}$ indication, etc. In one embodiment, different $2^{nd}$ indication resources (e.g., in time and/or frequency and/or code domain) may be configured to indicate different COT sharing information. Together with the configuration of transmitting and receiving the $2^{nd}$ indication, at least UE2 may be further configured with the default LBT type to be used if $2^{nd}$ indication is not received.

As further illustrated in the example of FIG. 6, at 610, UE1 may succeed in LBT type 1 and acquire the COT. At 620, based on the acquired COT, UE1 may determine and sends the $1^{st}$ indication to at least one determined responding UE, e.g., UE2 in the example of FIG. 6. In one embodiment, the indication may contain any COT-sharing information that is independent from the communication activities during the time gap T, such as the duration of the acquired COT. As mentioned above, the $1^{st}$ indication may further contain the configuration/activation of the $2^{nd}$ indication, such as the configuration described with respect to procedure 600. In one embodiment, the configuration of the $2^{nd}$ indication may be determined based on or associated to UE2's SL TX resource. For example, the resource for transmitting the $2^{nd}$ indication may appear immediately before UE2's SL TX in time domain, such that UE2 may apply LBT type 2C.

As also illustrated in the example of FIG. 6, at 630, UE1 may determine the $2^{nd}$ indication before a SL TX from UE2 inside its indicated COT duration, e.g., as indicated at 620. The $2^{nd}$ indication may contain additional information that UE2 should take account for performing UE2's SL TX by using the shared COT from UE1. In one embodiment, the $2^{nd}$ indication may be determined based on UE1's communication activities inside the time gap T. As one example, if UE1 performs a SL TX immediately before the start of UE2's SL TX, e.g., UE1 and/or another peer UE of UE1 performed consecutive transmission without pause before, or the channel is sensed by UE1 to be continuously idle during the transmission pause, UE1 may determine that UE2 may use type 2C afterwards. The SL TX immediately before the start of UE2's SL TX may contain at least the $2^{nd}$ indication. If there was a pause between when UE1 and/or another peer UE of UE1 stops transmitting and when the UE2's SL TX takes place, while the channel is sensed by UE1 as free in the gap, UE1 may perform type 2A to perform the SL TX immediately before the start of UE2's SL TX. In another example, if UE1 did not perform SL TX immediately before the start of UE2's SL TX, UE1 may determine that UE2 may use type 2A/2B if continuously idle is sensed by UE1 during SL transmission pause. In another example, if UE1 performs and succeeds in LBT type 1 during the time gap T, UE1 may obtain a new COT before the SL TX of UE2. In this case, UE1 may determine a new COT accordingly. In one embodiment, if different $2^{nd}$ indication resources are used to carry different indication information, UE1 may determine a proper $2^{nd}$ indication resource to reflect the corresponding information. In one example, UE2's SL TX resource may be scheduled/coordinated by UE1. In another example, UE1 may receive an SCI from UE2 before, where the SCI indicates UE2's selected resources for its future transmissions and, thus, UE1 may determine UE2's SL TX accordingly.

In one embodiment, in order to reduce the processing time of the second indication at UE2, the second indication may be transmitted in a light format such that UE2 can quickly detect the second indication to unlock type 2C. As one example, the second indication may be transmitted in a similar manner as physical sidelink feedback channel (PSFCH), where one or multiple PSFCH-like resources is configured at UE1 and/or UE2 for transmitting and receiving the second indication. Thus, due to the light format for transmitting the second indication, the amount of information that can be indicated in the second indication is more limited when compared to the first indication. In another embodiment, the $2^{nd}$ indication may be an SCI containing at least one information element (IE) that can be recognized by UE2 and/or UE3. For example, the $2^{nd}$ indication may be an SCI containing an identifier of UE1. The data associated to the SCI may be the data to be received by UE2 and/or by another UE.

In the example of FIG. 6, at 640, UE1 may transmit the determined $2^{nd}$ indication to UE2 by using the configured and/or determined resource for the $2^{nd}$ indication. At 650, based on the $1^{st}$ and the $2^{nd}$ indications, UE2 may determine how to perform SL TX by using the shared COT from UE1, e.g., as described above. UE2 may then, at 660, perform its SL TX inside the COT duration shared by UE1, based on the determination made at procedure 650.

It is noted, in one embodiment, the COT sharing from UE1 to UE2 may be iterated/extended based on the described procedure continuously. For example, after UE2 performs the first SL TX after receiving the second indication and before a second SL TX from UE2, there might be another time gap T'. In this case, UE1 may send a $3^{rd}$ indication containing the same information as described at 630 and 640 before the second SL TX from UE2. Accordingly, upon receiving the $3^{rd}$ indication from UE1, UE2 may perform the same behaviour regarding the $3^{rd}$ indication as described above with respect to the $2^{nd}$ indication.

In one embodiment, the provided 2-step COT sharing scheme may be applied/activated for certain use cases, e.g., based on the priority level of the SL TX from UE2. In one embodiment, instead of unicast, UE1 may groupcast/broadcast the $1^{st}$ and/or the $2^{nd}$ indication to multiple responding devices, e.g., UE2 and UE3 and/or other devices. In case UE1 groupcast/broadcast the $2^{nd}$ indication to multiple responding devices, the configuration used for the $2^{nd}$ indication may be configured at all of the responding devices.

FIG. 7A illustrates an example flow diagram of a method for COT sharing for SL in unlicensed spectrum are provided, according to an example embodiment. In certain example embodiments, the flow diagram of FIG. 7A may be performed by a network entity or network node (e.g., apparatus 10 illustrated in FIG. 8A) in a communications system, such as LTE or 5G NR. In some example embodiments, the network entity performing the method of FIG. 7A may include or be included in a device or UE, such as a SL UE, or the like. In one embodiment, the network node performing the method of FIG. 7A may include an initiating UE, such as UE1 illustrated in the examples of FIGS. 4-6.

As illustrated in the example of FIG. 7A, in one embodiment, the method may include, at 705, acquiring a COT. For example, the initiating UE may be succeed in LBT type 1 and acquire the COT. Upon acquiring the COT, the method may include, at 710, transmitting a first indication to at least one responding UE. In an embodiment, the first indication may include at least a duration of the COT and/or configuration information for at least one second indication. In some example embodiments, the first indication may include detailed COT sharing information, such as the COT duration, an identifier of the responding UE(s), e.g. using SCI, MAC CE, PC5-RRC or other upper layer message. The configuration information for the at least one second indication may be based on or associated to a SL TX resource of the at least one responding UE. According to one embodiment, the first indication may further include an activation for the at least one second indication. In certain embodiments, the first indication may also include information that the responding UE(s) do not need to detect transmission pause and/or sense the channel during the transmission pause. In an embodiment, the transmitting 710 may include transmitting the at least one second indication in a light format such that the responding UE can quickly detect the at least one second indication to unlock LBT type 2C. For example, the transmitting of the at least one second indication in the light format may include transmitting an indication signal over a PSFCH, transmitting an indication as part of a first stage SCI, transmitting an indication as part of a second stage SCI, and/or transmitting an indication in a MAC CE.

According to certain embodiments, the initiating UE may be configured with a configuration of one or more resources for transmitting the second indication, and the configuration may include at least one of a time, frequency, or code domain resources used for the second indication. In some embodiments, the UE(s) may be configured by the network, by pre-configuration, by technical specifications, and/or by SL signaling, for example. According to certain embodiments, the resources may be (or may not be) associated with the first indication and/or the resources may be implicitly associated with the SL TX of the at least one responding UE. In one embodiment, the resources for transmitting the second indication in time domain may be placed immediately before a resource of the SL TX of the at least one responding UE. In one embodiment, the resources for transmitting the second indication in time domain may be determined based on an identified transmission pause. For example, the resource for transmitting the second indication may appear at the end of identified transmission pause that can be predicted based on the reserved resources of the monitored SCI from relevant SL UEs. In an embodiment, different second indication resources may be configured to indicate different COT sharing information.

As further illustrated in the example of FIG. 7A, the method may include, at 715, determining the at least one second indication based on at least one of the initiating UE's communication activities and/or channel sensing during a time gap T (e.g., as shown in FIG. 5) between transmitting the first indication and receiving a SL TX. In one embodiment, the determining 715 may include, when the initiating UE performs a SL TX immediately before a start of a SL TX by the at least one responding UE, determining that the at least one responding UE should use LBT type 2C. In this case, the SL TX immediately before a start of a SL TX by the at least one responding UE may include at least the at least one second indication. In one example, if there was a pause between when the initiating UE and/or another peer UE of the initiating UE stop transmitting and when the responding UE's SL TX takes place, while the channel is sensed by the initiating UE as free in the gap, the initiating UE may perform LBT type 2A to perform the SL TX right before the start of the responding UE's SL TX.

According to an embodiment, when the initiating UE did not perform a SL TX immediately before a start of a SL TX by the at least one responding UE, the determining 715 may include determining that the at least one responding UE should use LBT type 2A or 2B if continuously idle is sensed during a SL TX pause. In an embodiment, when the initiating UE performs and succeeds in LBT type 1 during the time gap, the determining 715 may include determining a new COT before the SL TX of the at least one responding UE. In an embodiment, when different second indication resources are used to carry different indication information, the determining 715 may include determining a resource for the at least one second indication to reflect the corresponding different indication information.

As illustrated in the example of FIG. 7A, the method may include, at 720, transmitting the at least one second indication to the at least one responding UE prior to a SL TX from the at least one responding UE. The at least one second indication may include at least one of an indication of LBT type that the at least one responding UE should apply for the SL TX taking place within the COT duration and/or an indication of a new COT duration. In one embodiment, the at least one second indication may include an SCI comprising at least one IE that can be recognized by the responding UE(s). For example, the at least one second indication may be an SCI containing an identifier of the initiating UE and the data associated to the SCI may be the data to be received by the responding UE(s) and/or by another UE.

In one embodiment, the resources for transmitting the second indication may be configured at an end of every TTI, and the transmitting 720 may include transmitting the second indication when there is no sidelink transmission in the transmission time interval (TTI). According to some embodiments, the resources for transmitting the second indication may be associated with at least one information contained in the first indication, such as an ID contained in the SCI of the first indication, the resource used by the first indication, and/or the priority of the first indication.

FIG. 7B illustrates an example flow diagram of a method for COT sharing for SL in unlicensed spectrum are provided, according to an example embodiment. In certain example embodiments, the flow diagram of FIG. 7B may be performed by a network entity or network node (e.g., apparatus 20 illustrated in FIG. 8B) in a communications system, such as LTE or 5G NR. In some example embodiments, the network entity performing the method of FIG. 7B may include or be included in a device or UE, such as a SL UE, or the like. In one embodiment, the network node performing the method of FIG. 7B may include a responding UE, such as UE2 and/or UE3 illustrated in the examples of FIGS. 4-6.

As illustrated in the example of FIG. 7B, the method may include, at 750, receiving, from an initiating UE, a first indication at responding UE. In an embodiment, the first indication may include at least a duration of the COT and/or configuration information for at least one second indication. In some example embodiments, the first indication may include detailed COT sharing information, such as the COT duration, an identifier of the responding UE, e.g., in a SCI, MAC CE, PC5-RRC or other upper layer message. The configuration information for the at least one second indication may be based on or associated to a SL TX resource of the at least one responding UE. According to one embodiment, the first indication may further include an activation for the at least one second indication. In certain embodiments, the first indication may also include information that the responding UE(s) do not need to detect transmission pause and/or sense the channel during the transmission pause. In an embodiment, the receiving 750 may include receiving the at least one second indication in a light format such that the responding UE can quickly detect the at least one second indication to unlock LBT type 2C. For instance, the at least one second indication in the light format may include an indication signal transmitted over a physical sidelink feedback channel (PSFCH), an indication provided as part of a first stage sidelink control information (SCI), an indication provided as part of a second stage sidelink control information (SCI), and/or an indication provided as a medium access control (MAC) control element (CE).

In certain embodiments, the method may include, at 755, receiving the at least one second indication prior to a SL TX by the responding UE. According to an embodiment, the at least one second indication may include at least one of an indication of a LBT type that the responding UE should apply for the SL TX taking place within the COT duration or an indication of a new COT duration.

In some embodiments, the responding UE may be configured with a configuration of one or more resources for receiving the at least one second indication, and the configuration may include at least one of a time, frequency, or code domain resources used for the at least one second indication. In an embodiment, the resources may be associated with the first indication, and/or the resources are implicitly associated with the SL TX of the responding UE. According to some embodiments, the resources for receiving the at least one second indication in time domain may be immediately before a resource of the SL TX of the responding UE. In one embodiment, the resources for receiving the at least one second indication in time domain may be determined based on an identified transmission pause. In an embodiment, the resources for receiving the at least one second indication may be configured at an end of every TTI, and the receiving 755 of the at least one second indication may include receiving the at least one second indication when there is no SL TX in the TTI. In one embodiment, the resources for receiving the at least one second indication may be associated with at least one information contained in the first indication, such as an ID contained in the SCI of the first indication, the resource used by the first indication, and/or the priority of the first indication. In some embodiments, different resources for the at least one second indication may be configured to indicate different COT sharing information.

Based on the information received in the first indication and/or the second indication, the method may include, at 760, determining at least one of the COT and/or the LBT type to apply for the SL TX. For example, the responding UE may determine how to perform the SL TX using the COT sharing information provided in the first and/or second indication. In an embodiment, the determining 760 may include determining to apply LBT type 2 as a default LBT type for performing the sidelink transmission. For example, in some embodiments, together with the configuration for receiving the second indication, the responding UE may be further configured with a default LBT type to be used, e.g., if the second indication is not received. In one embodiment, the determining 760 may include determining to apply the LBT type indicated by the indication of LBT type in the at least one second indication for the SL TX. In an embodiment, when the at least one second indication includes a new COT duration, the determining 760 may include applying the new COT duration for the SL TX. As further illustrated in the example of FIG. 7B, the method may further include, at 765, performing the SL TX based on the determination made at 760.

FIG. 8A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be a mobile device, UE, SL UE, or other similar node or device, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8A.

As illustrated in the example of FIG. 8A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 8A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IOT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network element or node, such as a mobile device, UE, SL UE, or other similar node or device, for instance. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIG. 6, 7A or 7B, or any other method described herein. In some embodiments, as discussed herein, apparatus 10 may be configured to perform a procedure relating to COT sharing for SL in unlicensed spectrum, for example.

FIG. 8B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IOT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IOT, Bluetooth, NFC, MulteFire, and/or any other radio access technologies. It should be noted that one of ordinary skill in the art would understand that apparatus 20 may include components or features not shown in FIG. 8B.

As illustrated in the example of FIG. 8B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IOT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IOT device, or the like, for example. According to certain embodiments, apparatus 20 may be controlled by memory 24 and processor 22 to perform the functions associated with any of the embodiments described herein, such as one or more of the operations illustrated in, or described with respect to FIG. 6, 7A or 7B, or any other method described herein. For example, in an embodiment, apparatus 20 may be controlled to perform a process relating to COT sharing for SL in unlicensed spectrum, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, displays, and/or computer program code for causing the performance of any of the operations described herein.

In view of the foregoing, certain example embodiments provide several technological improvements, enhancements, and/or advantages over existing technological processes and constitute an improvement at least to the technological field of wireless network control and/or management. For example, as discussed in detail above, certain example embodiments can provide methods and/or apparatuses for COT sharing for SL in unlicensed spectrum. As a result, certain embodiments reduce the effort of a responding UE for identifying a transmission pause in the COT duration and sensing the channel during the identified transmission pause. In addition, some embodiments may address the initiating UE's communication uncertainty in the (large) time gap T to enable using of LBT type 2C. Thus, the initiating UE (and its peer SL UE) is not required to keep transmitting in the time gap T, which provides more flexibility to the initiating UE. Besides enabling LBT type 2C, the same $2^{nd}$ indication may also serve to extend the COT duration, e.g., in case the initiating UE acquires a new COT in the time gap T. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. An apparatus, comprising:
at least one processor; and
at least one memory comprising computer program code, the at least one memory and the computer program code are configured, with the at least one processor, to cause the apparatus at least to:
upon acquiring a channel occupancy time, transmit a first indication to at least one responding user equipment, wherein the first indication comprises at least one of: a duration of the channel occupancy time, or configuration information for at least one second indication; and
transmit the at least one second indication to the at least one responding user equipment prior to a sidelink transmission from the at least one responding user equipment, wherein the at least one second indication comprises at least one of: an indication of listen before talk type that the at least one responding user equipment should apply for the sidelink transmission taking place within the channel occupancy time duration, or an indication of a new channel occupancy time duration.

2. The apparatus of claim 1, wherein the first indication further comprises an activation for the at least one second indication.

3. The apparatus of claim 1, wherein the configuration information for the at least one second indication is based on or associated to a sidelink transmission resource of the at least one responding user equipment.

4. The apparatus of claim 1, wherein the at least one memory and computer program code are configured, with the at least one processor, to cause the apparatus at least to:
transmit the at least one second indication in a light format, and wherein the at least one second indication in the light format comprises at least one of: an indication signal transmitted over a physical sidelink feedback channel, an indication provided as part of a first stage sidelink control information, an indication provided as part of a second stage sidelink control information, or an indication provided as a medium access control control element.

5. The apparatus of claim 1, wherein the apparatus is configured with a configuration of one or more resources for transmitting the at least one second indication,
and wherein the configuration comprises at least one of:
a time, frequency, or code domain resources used for the at least one second indication.

6. The apparatus of claim 5, wherein the resources are associated with the first indication, or the resources are implicitly associated with the sidelink transmission of the at least one responding user equipment.

7. The apparatus of claim 5, wherein the resources for transmitting the at least one second indication in time domain is immediately before a resource of the sidelink transmission of the at least one responding user equipment.

8. The apparatus of claim 5, wherein the resources for transmitting the at least one second indication in time domain is determined based on an identified transmission pause.

9. The apparatus of claim 5, wherein the resources for transmitting the at least one second indication are configured at an end of every transmission time interval, and wherein the transmitting comprises transmitting the at least one second indication when there is no sidelink transmission in the transmission time interval.

10. The apparatus of claim 5, wherein the resources for transmitting the at least one second indication are associated with at least one information contained in the first indication.

11. The apparatus of claim 5, wherein different second indication resources are configured to indicate different channel occupancy time sharing information.

12. The apparatus of claim 1, wherein the at least one memory and computer program code are configured, with the at least one processor, to cause the apparatus at least to:

determine the at least one second indication based on at least one of: communication activities of the apparatus, or channel sensing during a time gap between transmitting the first indication and receiving a sidelink transmission.

13. The apparatus of claim 12, wherein, to determine the at least one second indication, the at least one memory and computer program code are configured, with the at least one processor, to cause the apparatus at least to:

when the apparatus performs a sidelink transmission immediately before a start of a sidelink transmission by the at least one responding user equipment, determine that the at least one responding user equipment should use listen before talk type 2C, and wherein the sidelink transmission immediately before a start of a sidelink transmission by the at least one responding user equipment comprises the at least one second indication.

14. The apparatus of claim 12, wherein, to determine the at least one second indication, the at least one memory and computer program code are configured, with the at least one processor, to cause the apparatus at least to:

when the apparatus did not perform a sidelink transmission immediately before a start of a sidelink transmission by the at least one responding user equipment, determine that the at least one responding user equipment should use listen before talk (LBT) type 2A or 2B if continuously idle is sensed during a sidelink transmission pause.

15. The apparatus of claim 12, wherein, to determine the at least one second indication, the at least one memory and computer program code are configured, with the at least one processor, to cause the apparatus at least to:

when the apparatus performs and succeeds in listen before talk type 1 during the time gap, determine a new channel occupancy time before the sidelink transmission of the at least one responding user equipment.

16. The apparatus of claim 12, wherein, to determine the at least one second indication, the at least one memory and computer program code are configured, with the at least one processor, to cause the apparatus at least to:

when different second indication resources are used to carry different indication information, determine a resource for the at least one second indication to reflect the corresponding different indication information.

17. An apparatus, comprising:

at least one processor; and at least one memory comprising computer program code, the at least one memory and the computer program code are configured, with the at least one processor, to cause the apparatus at least to:

receive, from an initiating user equipment, a first indication, wherein the first indication comprises at least one of a duration of a channel occupancy time or configuration information for at least one second indication;

receive the at least one second indication prior to a sidelink transmission by the apparatus, wherein the at least one second indication comprises at least one of an indication of listen before talk type that the apparatus should apply for the sidelink transmission taking place within the channel occupancy time duration or an indication of a new channel occupancy time duration;

based on at least one of the first indication and the second indication, determine at least one of the channel occupancy time or the listen before talk type to apply for sidelink transmission; and perform the sidelink transmission based on the determination.

18. A method, comprising:

upon acquiring a channel occupancy time, transmitting, by an initiating user equipment, a first indication to at least one responding user equipment, wherein the first indication comprises at least one of a duration of the channel occupancy time or configuration information for at least one second indication; and transmitting the at least one second indication to the at least one responding user equipment prior to a sidelink transmission from the at least one responding user equipment, wherein the at least one second indication comprises at least one of an indication of listen before talk type that the at least one responding user equipment should apply for the sidelink transmission taking place within the channel occupancy time duration or an indication of a new channel occupancy time duration.

19. The method of claim 18, wherein the first indication further comprises an activation for the at least one second indication.

20. The method of claim 18, further comprising:

determining the at least one second indication based on at least one of: communication activities of the initiating user equipment, or channel sensing during a time gap between transmitting the first indication and receiving a sidelink transmission.

* * * * *